UNITED STATES PATENT OFFICE.

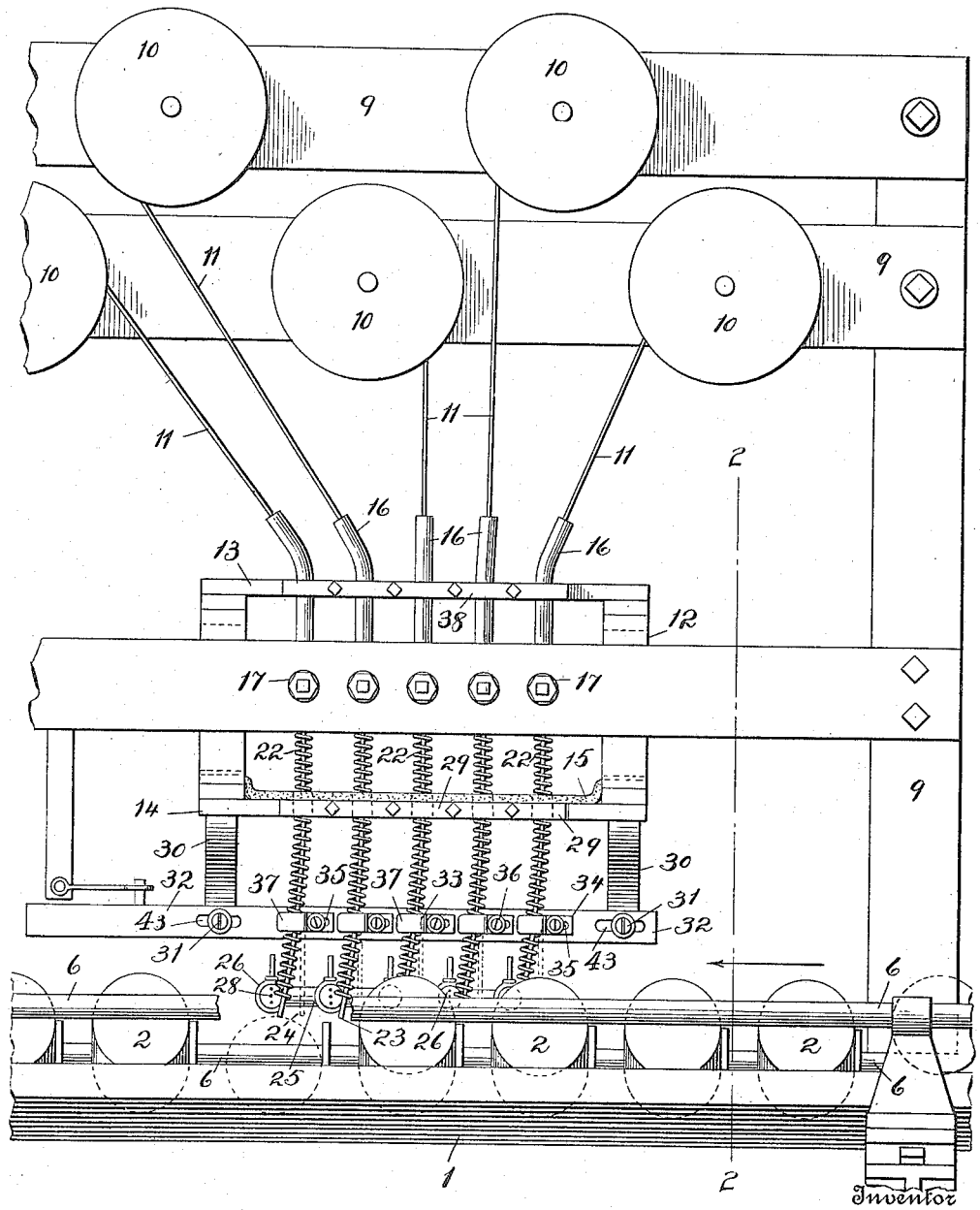

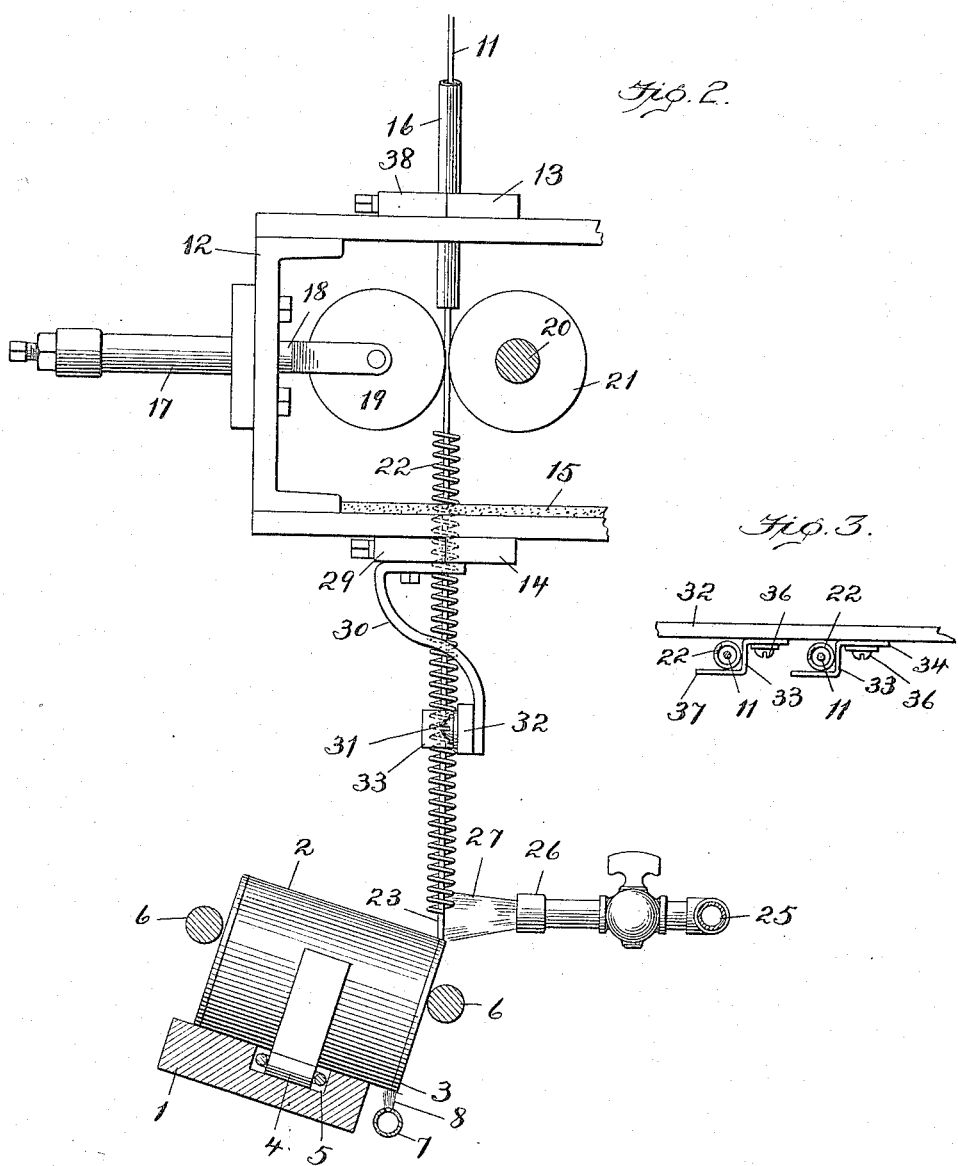

DARWIN D. RANNEY, OF BALTIMORE, MARYLAND, ASSIGNOR TO ATLANTIC CAN COMPANY, OF BALTIMORE, MARYLAND, A CORPORATION OF NEW JERSEY.

CAN-SOLDERING MACHINE.

1,133,237. Specification of Letters Patent. Patented Mar. 23, 1915.

Application filed January 17, 1913. Serial No. 742,533.

*To all whom it may concern:*

Be it known that I, DARWIN D. RANNEY, a citizen of the United States, residing at Baltimore, in the State of Maryland, have invented certain new and useful Improvements in Can-Soldering Machines, of which the following is a specification.

This invention relates to an improved solder guide mechanism for that class of machines which are employed in the manufacture of sheet-metal cans, and while the invention is shown in connection with a mechanism for soldering the end seams of cans it is readily adaptable for soldering the side seams of such cans.

The object of the invention is to combine a heating means and an improved solder-sustaining means whereby the solder may be normally held away from the solder-melting zone but which will be actuated during the soldering operation to shift the position of the solder and temporarily hold it in the solder-melting zone.

Another object of the invention is to provide an improved construction of solder guide through which the solder is fed toward the work.

With these and other objects in view the invention is illustrated in the accompanying drawings wherein, Figure 1, shows a side elevation of a portion of a can soldering machine and a similar view of my improved solder guide mechanism. Fig. 2, illustrates a vertical cross-sectional elevation through the machine and shows an end view of the improved guide mechanism,—the section in this view being taken on the line 2—2 of Fig. 1, and Fig. 3, shows a detail plan view of the devices employed to engage and retain the solder guide devices.

In the drawing, 1, designates a can-body sustaining track along which the cans may be made to roll. In the present instance this track is slightly inclined in a crosswise direction so as to cause the rolling cans, 2, to assume a slightly inclined position with the end seam, 3, which is to be soldered at the lower side of the track. Suitable propelling means such as a chain, 4, travels in a groove, 5, in the track and serves to advance and roll the cans along. Guide rods, 6, are provided at the opposite ends of the row of cans and prevent longitudinal displacement of the cans while the latter are advanced. In the present instance a gas pipe, 7, extends in a direction parallel with the lower edge of the track and at such position as to direct a flame, 8, against the can seam in order to preliminarily heat the same before solder is applied, thereby aiding in sweating the solder into the seam. A suitable frame, 9, is supported in an elevated position with respect to the can track and said frame serves as a support for the reels, 10, which carry the wire solder, 11. Below the reels and between the latter and can track, the frame sustains a supplemental frame, 12, having upper and lower horizontal bars, 13, and 14, respectively,—the lower bar preferably having a covering of sheet material such as asbestos, 15, which will serve as a non-conductor of heat. A series of solder-guide tubes 16, are suitably secured in place so as to extend above and below the upper bar, 13, and the solder wire strands are run from the reels and then through the guide tubes. Between the upper and lower bars, 13, and, 14, the supplemental frame supports suitable horizontal tubes, 17,—there being one tube for each solder wire strand employed. Each tube serves as a bearing or bushing to sustain a rod, 18, and each rod is provided with a roller, 19, at its inner end so that its circumference may engage the solder wire. These rods, 18, and rollers are adjustably secured so as to be moved toward or from the solder wire as desired. A shaft, 20, extends horizontally between the upper and lower bars, 13, and, 14, and this shaft carries a series of feed rollers, 21, which are rotated upon each movement of the said shaft. The number of feed rollers on this shaft corresponds with the number of solder strands and rollers, 19, and as is common in feeding wire solder one roller is at one side of the wire solder strand while the feed roller for that same strand is at the diametrically opposite side of the latter so that the strand will be clamped between the two rollers.

All of the features hereinbefore described are common in can-making machines and particularly in those soldering machines known as floaters, and no claim is made broadly to them, but such a structure, or a structure performing the equivalent operation, forms the foundation on which my improvement is based as will now be more particularly set forth.

Ordinarily the wire solder is passed through guide tubes to the point where it is heated to a molten condition by being brought into contact with a heated steel or other surface. In the present invention I have found that by providing a flexible guide, such for example as a spiral wire guide, 22, that excellent results are gained. These spiral guides, in the present instance, extend from a point above the sheet, 15, of asbestos down to a point in comparatively close proximity to the can bodies and the wire solder strand, 11, extends freely through the flexible guide and has its lower end, 23, projected from the lower end of the flexible guide. The projecting end, 23, of the solder has position where it will contact with the circumference of the heated can seam and as the can advances the flexibility of the guide will enable the solder to follow along with the can for a short distance,—the guide yielding as the solder rides over the circumference of the can.

Normally the flexible guides will have a straight up and down or vertical position this holding the projected wire solder end in a substantially pendant position as indicated by the broken lines, 24, in Fig. 1. In the present instance five flexible guides are shown, but this is immaterial and the number may be more or less than shown. At one side of these flexible guides there is provided a gas pipe, 25, having a series of gas burners, 26. The position of these gas burners with respect to the normal positions of the solder wire ends, 23, is of importance and works out good results in practice, for it will be noted that when the wire ends are in the normal positions they will be located to one side of and out of path of the flame, 27, of said burners, consequently the solder guides are not being constantly heated by the burners. The burners, 26, preferably have holes, 28, which are arranged in a vertical row so as to project a flame which will be broad in a direction that will parallel the normal position of the solder wire strand. When however a can is rolled beneath the wire solder end, 23, the latter will ride up over the circumference of the can body and be bent laterally and into the direct path of the flame,—the flexible guide yielding to allow the solder to thus be moved. Obviously when the solder end is brought into contact with the previously heated seam and then into the direct path of the flame from the burner, 26, the flame of said latter burner will have direct access to the solder end because it will not only attack the projecting end but will reach the solder through the spaces in the lower end of the spiral guide and effectually melt and deposit the solder on the seam of the rolling can. Immediately upon the can passing from beneath the solder end or upon the end of the solder being melted, the flexibility of the guide will at once restore the solder to its normal position and out of the path and action of the flame.

The guide tubes, 16, are secured in place by means of a clamp bar, 38, which clamps said tubes against the bar, 13, while the flexible guides, 22, are secured against the bar, 14, by means of a clamp bar, 29,—the latter guides being located directly below the tubes, 16, and guiding the solder as it is fed by the rollers, 21.

Two pendant brackets, 30, depend from the lower bars, 14, and, 29, and the lower end of each bracket has a guide screw or pin, 31, which pins sustain an adjuster bar, 32. This bar, 32, in the present instance is provided with horizontal slots, 43, through which the screws or pins, 31, extend loosely so that said bar may be moved longitudinally for a purpose which will presently be explained. The position of the adjuster bar, 32, is such with respect to the flexible guides, 22, that the latter will extend downwardly in close proximity to and at one side thereof.

A plurality of engaging members, 33, are provided on the adjuster bar, 32, which members are designed to engage the flexible spiral guides, 22. In the present instance the engaging members have the form of angle plates one end, 34, of each of which seats against the adjuster bar and is provided with a horizontally-extending slot, 35, so that a set screw, 36, may pass therethrough and secure the member against the bar. By means of the slot and set screw the members may be adjusted or moved horizontally on the bar and locked in the adjusted position. The outer end, 37, of each engaging member embraces one of the flexible guides, as clearly shown in Fig. 3, so as to hold the latter against the vertical side of the adjuster bar.

As each flexible guide has its movable end connected through an engaging member with the adjuster bar, it is obvious that by moving the bar longitudinally the engaging members will adjust the normal pendant positions of the respective flexible guides with respect to the flames, 27, of burners, 26, and the length of time the solder end, 23, will be in register with the seam may thus be varied. When the bar, 32, is adjusted the screws, 31, will be tightened to lock it in the adjusted position.

In operation, the cans roll along the track and the seam to be soldered is previously heated by the flame, 8, from burner pipe, 7. The heated seam then contacts with the pendant ends, 23, of the successive wire strands, there being a sufficient number of solder strands to supply sufficient solder about the entire circumference of the can seam. As each solder strand contacts with the heated seam its flexible guide will be sprung laterally and travel with the seam and during this travel the end of the solder is brought into the path of the flame.

As the flexible guide is of a spiral wire formation the flame, 27, will have direct play on the solder through the openings in the spiral thus effectually melting the solder off clean and at the same time keeping the central opening in the flexible guide open by preventing the accumulation of solder therein.

Immediately upon the release of the solder, the flexible guides will spring back to their normal positions, which the engaging members determine and the solder wire is then fed down by the rotation of shaft, 20, and rollers, 21, in the usual way.

Having thus described my invention what I claim and desire to secure by Letters Patent is:—

1. In a can soldering machine the combination with means to convey can bodies, of a stationary burner adjacent to the path of the traveling cans to project a flame; a strand of wire solder normally to one side and out of the zone of said projecting flame,—the end of said solder strand normally projecting in the path of the cans to engage and be moved by the latter into the zone of the flame and be melted by the latter, and means for moving the unmelted portion of the solder strand to its normal position and out of the zone of the flame after its end has been melted.

2. In a can soldering machine the combination with means to convey can bodies, of a stationary burner adjacent to the path of the traveling cans to project a flame; a strand of wire solder normally to one side and out of the heat zone of said projecting flame; means for feeding the solder strand when it is out of the heat zone of the burner flame to project its end in the path of the can and enable the can to move said solder end laterally and into the heat zone of the flame and means for moving the unmelted portion of the solder strand out of the heat zone of the flame after the projected end has been melted therefrom.

3. In a can-soldering machine the combination with means for feeding wire solder to project the end of the solder in the path of a can; a burner normally in advance of the projecting solder-end; means for moving can bodies into engagement with the projecting end of the wire solder so as to move the latter into the heat zone of the burner and melt the end of the solder, and means for moving the remaining strand of solder from said heat zone of said burner after the end has been melted.

4. In a can-soldering machine the combination with a stationary burner to project a flame, of a yielding wire-solder guide normally to one side of the projecting flame; means for feeding wire solder through the solder guide to project an end of the solder in the path of the can to be soldered; means for moving the can into engagement with the projecting end of the solder to push said solder-end and its yielding guide along with the can and into the projecting flame whereby the solder end may be melted,— said yielding guide and remaining solder strand therein being movable away from said projecting flame when released by the melting of the projecting end of solder.

5. In a can soldering machine the combination with means to convey can bodies, of a stationary burner adjacent to the path of the can bodies; a spiral guide and means for feeding wire solder through the spiral guide to the seam of the moving can.

6. In a can soldering machine the combination with means to convey can bodies, of a stationary burner adjacent to the path of the can bodies; a spiral guide having its lower end free to be moved in a direction with the cans and means for feeding wire solder through the spiral guide into the path of the seam of the moving can whereby the can may move the solder and guide toward the burner.

7. In a can-soldering machine the combination with means to convey can bodies to be soldered, of a stationary burner; an open spiral spring guide through which wire solder may pass, said guide normally being away from the burner; means for feeding wire solder through the open spiral guide and project one end thereof from said guide and into the path of the can bodies whereby said end will be moved by the body into the flame from the burner and spring the guide from its normal position said spring guide returning the remaining portion of the wire solder after said end has been melted.

In testimony whereof I affix my signature in presence of two witnesses.

DARWIN D. RANNEY.

Witnesses:
IRVING B. THAWLEY,
JAMES F. COLE.

Copies of this patent may be obtained for five cents each, by addressing the "Commissioner of Patents, Washington, D. C."